United States Patent
Chen (10) Patent No.: US 7,502,332 B1
(45) Date of Patent: Mar. 10, 2009

(54) METHOD AND APPARATUS FOR ROUTE OSCILLATION REDUCTION

(75) Inventor: Enke Chen, San Jose, CA (US)

(73) Assignee: Redback Networks, Inc., San Jose, CA (US)

( * ) Notice: Subject to any disclaimer, the term of this patent is extended or adjusted under 35 U.S.C. 154(b) by 1302 days.

(21) Appl. No.: 10/214,901

(22) Filed: Aug. 8, 2002

(51) Int. Cl.
  *H04L 12/28* (2006.01)
(52) U.S. Cl. ...................................... 370/255
(58) Field of Classification Search .................. 370/255, 370/248, 238, 238.1, 349, 356, 395.31, 395.52, 370/401, 358; 709/238, 239, 240
  See application file for complete search history.

(56) References Cited

U.S. PATENT DOCUMENTS

| 6,760,777 | B1 * | 7/2004 | Agarwal et al. | 709/238 |
| 7,028,092 | B2 * | 4/2006 | MeLampy et al. | 709/230 |
| 7,180,864 | B2 * | 2/2007 | Basu et al. | 370/238 |

OTHER PUBLICATIONS

Bates, T., et al., "BGP Route Reflection—An Alternative to Full Mesh IBGP," Network Working Group RFC 2796, Apr. 2000.
McPherson, D., et al., "Border Gateway Protocol (BGP) Persistent Route Oscillation Condition," Network Working Group RFC 3345, Aug. 2002.
Traina, P., "Autonomous System Confederations for BGP," Network Working Group RFC 1965, Jun. 1996.
Walton, D., et al., "BGP Persistent Route Oscillation Solution," Network Working Group Internet Draft, http://search.ietf.org/internet-drafts/draft-walton-bgp-route-oscillation-stop-00.txt, May 2002.
Mills, D.L., "Exterior Gateway Protocol Formal Specification," Network Working Group RFC 904, Apr. 1984.
Rekhter, Y., "A Border Gateway Protocol 4 (BGP-4)," Network Working Group RFC 1771, Mar. 1995.
Traina, P., "Autonomous System Confederations for BGP," Network Working Group RFC 3065, Feb. 2001.

* cited by examiner

*Primary Examiner*—Chi H Pham
*Assistant Examiner*—Alexander Boakye
(74) *Attorney, Agent, or Firm*—Blakely, Sokoloff, Taylor & Zafman, LLP (57) ABSTRACT

A method and apparatus for route oscillation reduction is described. A method in a network element comprises advertising to a set of one or more internal peers a best external route if a best overall route is not an external route, wherein external routes are routes communicated from an external peer that is not within the network element's group, wherein said set of internal peers are within the network element's group, and advertising to a set of one or more external peers a best internal route that has been received from an internal peer if the best overall route is not an internal route.

40 Claims, 9 Drawing Sheets

METHOD AND APPARATUS FOR ROUTE OSCILLATION REDUCTION

BACKGROUND OF THE INVENTION

1. Field of the Invention

The invention relates to the field of communication. More specifically, the invention relates to communication networks.

2. Background of the Invention

The border gateway protocol (BGP) is defined by RFC 1771. BGP requires that network elements within the same autonomous system to have a full mesh communications. Having full mesh communications doesn't require each network element of the autonomous system to be physically linked with all other network elements of the autonomous system, but it does require each network element to have a BGP session with all other network elements within the same autonomous system. This full mesh communication requirement encounters a scalability problem. Confederations and route reflection, as respectively defined by RFC 1965 and RFC 1966, are proposed alternative solutions to the scalability problem.

Figure 1:
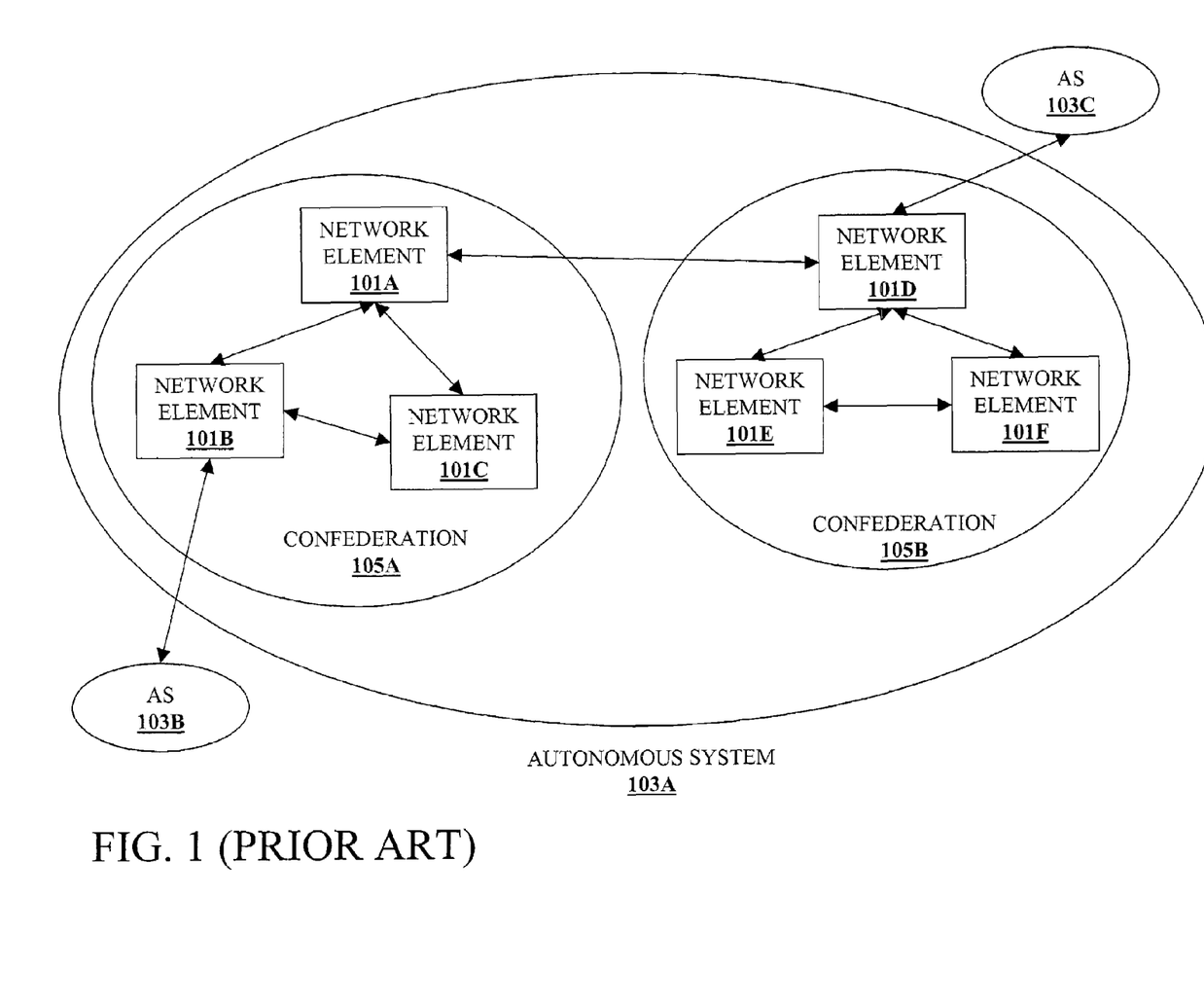
FIG. 1 (Prior Art) is a diagram illustrating confederations.

FIG. 1 (Prior Art) is a diagram illustrating confederations. In FIG. 1, an autonomous system 103A includes a confederation 105A and a confederation 105B. Each network element of a confederation must satisfy the full mesh requirement. The confederation 105A includes network elements 101A-101C. The confederation 105B includes network elements 101D-101F. The network elements 101A and 101D respectively act as border routers for the confederations 105A and 105B. The network element 101B is an autonomous system border router (ASBR) that communicates with an autonomous system 103B. The network element 101D also acts as an ASBR that communicates with an autonomous system 103C.

Figure 2:
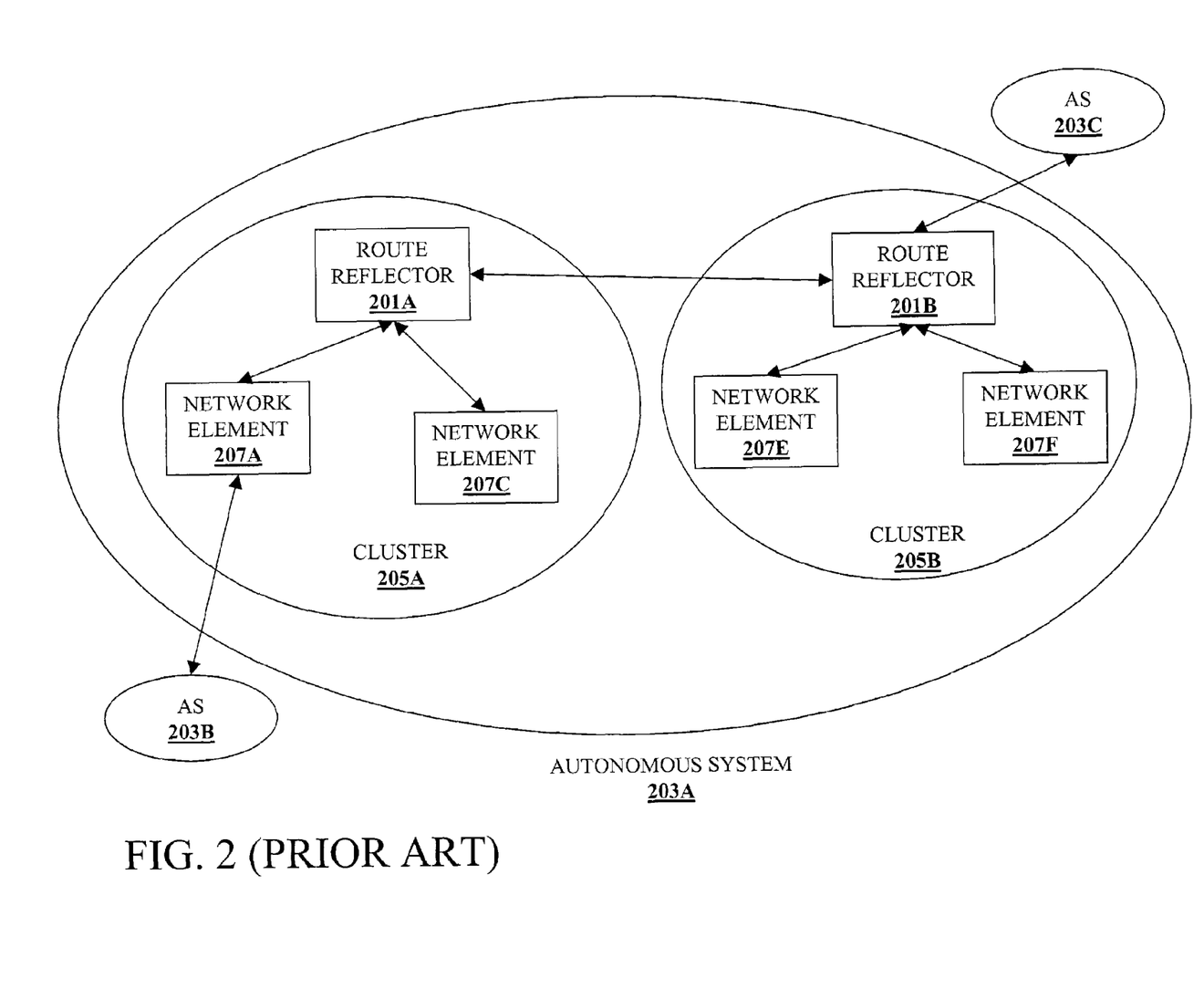
FIG. 2 (Prior Art) is a diagram illustrating route reflection.

FIG. 2 (Prior Art) is a diagram illustrating route reflection. An autonomous system 203A includes a cluster 205A and a cluster 205B. The cluster 205A includes a route reflector 201A and network elements 207A and 207C. The cluster 205B includes a route reflector 201B and network elements 207E and 207F. The route reflector 201A has BGP sessions with the network elements 207A and 207C. Likewise, the route reflector 201B has BGP sessions with network elements 207E and 207F. The network element 207A is an ASBR that communicates with an autonomous system 203B. Similarly, the network element 201B also acts as an ASBR that communicates with an autonomous system 203C.

Figure 3:
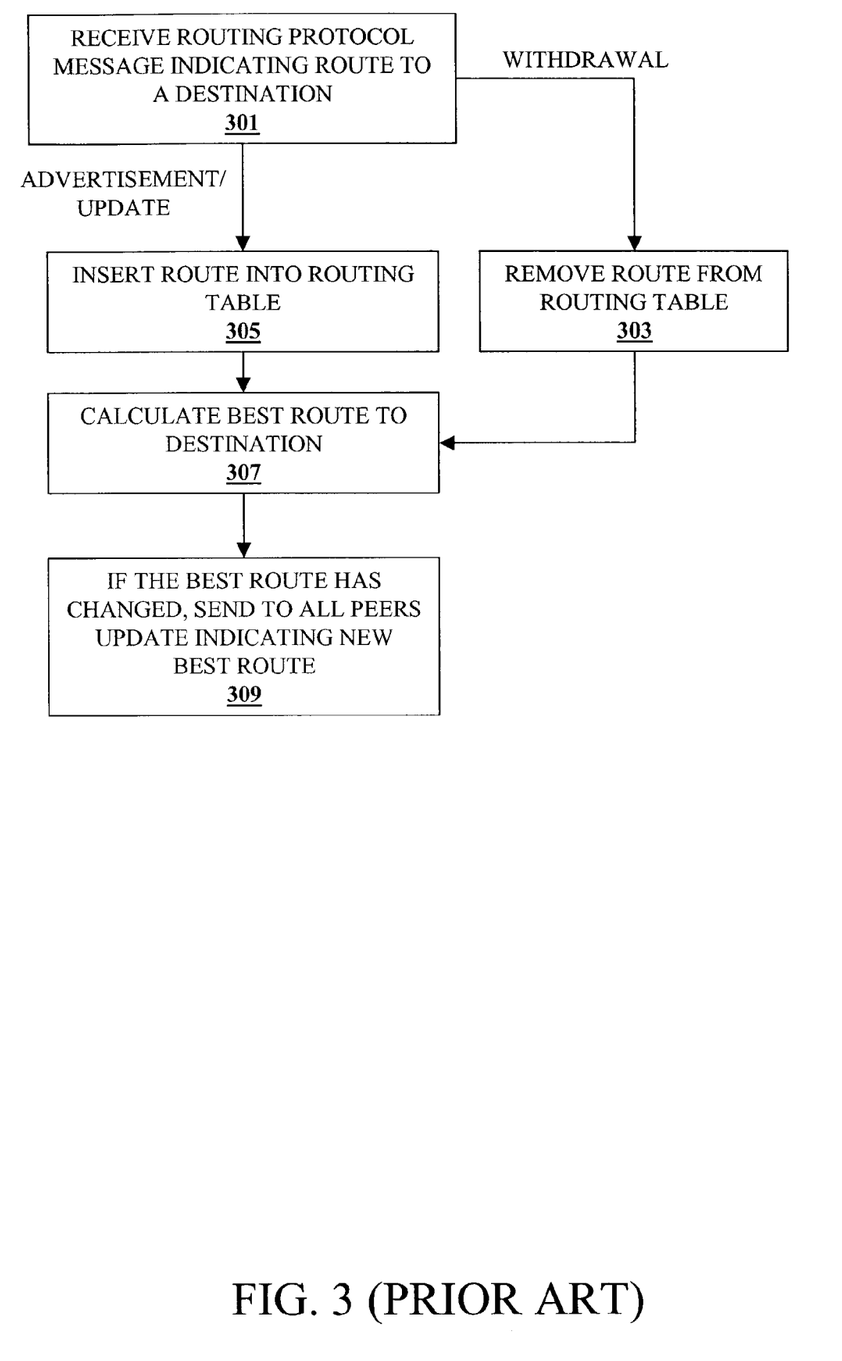
FIG. 3 (Prior Art) is a flowchart for processing a BGP message that indicates a route.

FIG. 3 (Prior Art) is a flowchart for processing a BGP message that indicates a route. A route reflector and a confederation border router handle route advertisements and process routing messages as illustrated in the flowchart a FIG. 3. At block 301, a routing protocol message indicating a route to a destination is received. If the routing protocol message is a withdrawal message, then control flows to block 303. If the routing protocol message is an advertisement/update message, then control flows to block 305.

At block 305, the route is inserted into the routing table. From block 305, control flows to block 307.

At block 303, the route is removed from the routing table. From block 303, control flows to block 307.

At block 307, a best route to the destination is calculated. At block 309, if the best route has changed, then an update message indicating the new best route is sent to all peers.

Figure 4:
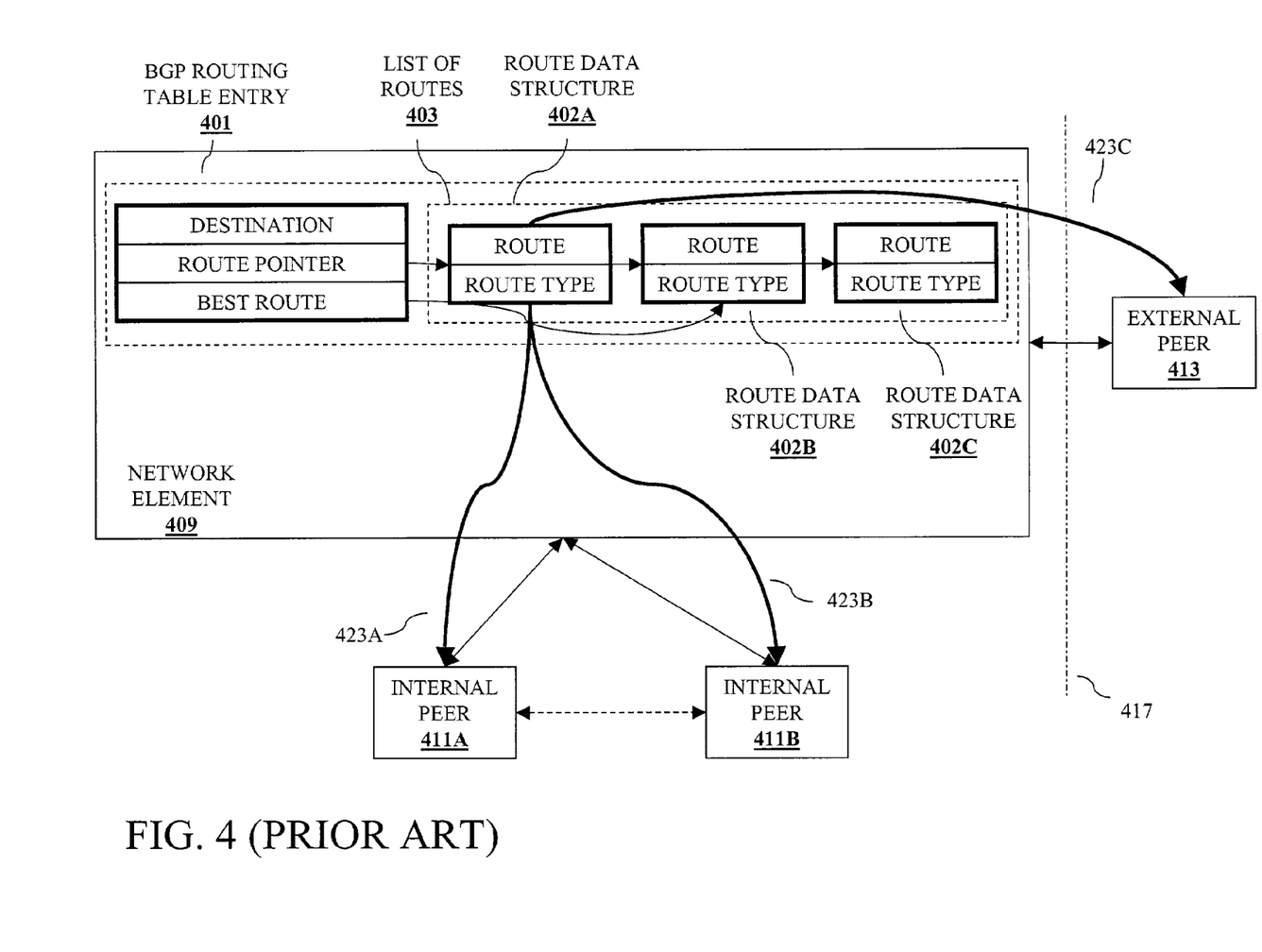
FIG. 4 (Prior Art) is a diagram illustrating data structures for tracking routes.

FIG. 4 (Prior Art) is a diagram illustrating data structures for tracking routes. In FIG. 4, a network element 409 has BGP sessions with an external peer (i.e., a route reflector of a different cluster or a border router of a different confederation) 413 and internal peers 411A and 411B (i.e., a peer within the same cluster or a peer within the same confederation). The network element 409 includes a BGP routing table entry 401. The BGP routing table entry indicates a destination, a route pointer, and a best route pointer. The route pointer points to the head of a list of routes 403. The list of routes 403 in FIG. 4 includes route data structures 402A-402C. Each of the route data structures 402A-402C indicates a route, including AS_PATH, MED, NEXT_HOP, etc. In FIG. 4, the best route pointer of the BGP routing table entry 401 references the route data structure 402B. Therefore, the network element 409 transmits to the external peer 413 and the internal peers 411A and 411B a BGP routing message that indicates the route of the route data structure 402B.

Unfortunately, in certain situations, a communication of a best route by a route reflector or a confederation border router causes route oscillation, which typically occurs within the same autonomous system.

BRIEF SUMMARY OF THE INVENTION

A method and apparatus for route oscillation reduction is described. According to one aspect of the invention, a method in a network element provides advertising to a set of one or more internal peers a best external route if a best overall route is not an external route, wherein external routes are routes communicated from an external peer that is not within the network element's group, wherein said set of internal peers are within the network element's group, and advertising to a set of one or more external peers a best internal route that has been received from an internal peer if the best overall route is not an internal route.

These and other aspects of the present invention will be better described with reference to the Detailed Description and the accompanying Figures.

BRIEF DESCRIPTION OF THE DRAWINGS

The invention may best be understood by referring to the following description and accompanying drawings that are used to illustrate embodiments of the invention. In the drawings.

DETAILED DESCRIPTION OF THE INVENTION

In the following description, numerous specific details are set forth to provide a thorough understanding of the invention. However, it is understood that the invention may be practiced without these specific details. In other instances, well-known circuits, structures, standards, and techniques have not been shown in detail in order not to obscure the invention. Throughout the description to detailed description the terms "internal peers" and "external peers" are used. In the context of route reflection, internal peers are clients and external peers are non-clients. In the context of confederations, internal peers are peers within the same confederation, and external peers are peers within a different confederation. In addition, a best internal route is a best path to a destination of all paths to the destination learned from internal peers. Similarly, a best external route is a best path to a destination of all paths to the destination learned from external peers. Furthermore, the term route is used throughout the detailed description although the term route and path are typically used interchangeably.

Figure 5:
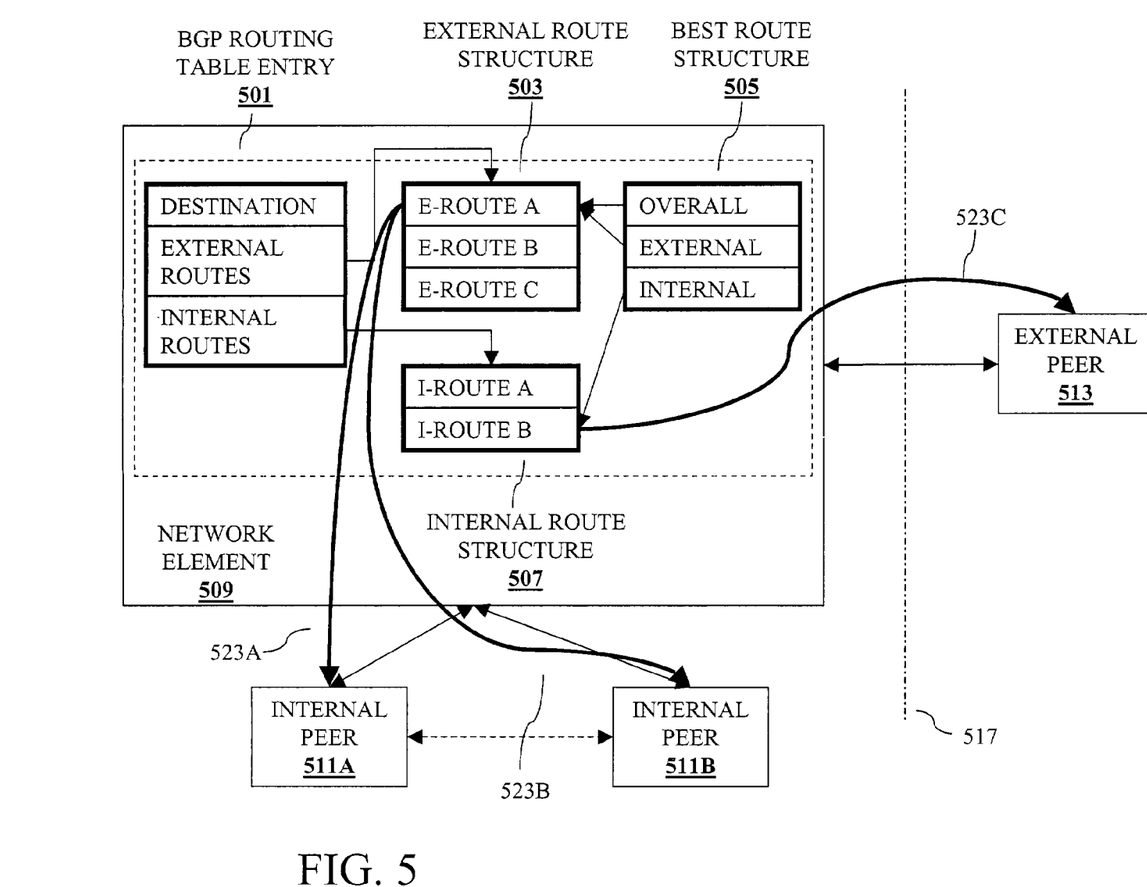
FIG. 5 is an exemplary diagram illustrating data structures for tracking a best internal route and a best external route according to one embodiment of the invention.

FIG. 5 is an exemplary diagram illustrating data structures for tracking a best internal route and a best external route according to one embodiment of the invention. In FIG. 5, a network element 509 has BGP sessions with an external peer 513 and internal peers 511A and 511B. Although the Figures are described with reference to BGP, the described invention can be applied to a different routing protocol (e.g., EGP, OSPF, RIP, etc.). A line 517 separates the network element's 509 group from the external peer 513 of a different group. If the network element 509 is a route reflector, then the group of the network element 509 is a cluster, whereas if confederations are implemented on the network element 509 then the group is a confederation. Moreover, if the network element 509 is a route reflector and the internal peers 511A and 511B are in the route reflector's cluster, then a BGP session between the internal peers 511A and 511B is unnecessary. If the network element 509 and the internal peers 511A and 511B are within a confederation, then a BGP session must be established between the internal peers 511A and 511B.

The network element 509 includes a BGP routing table entry 501. The BGP routing table entry 501 indicates a destination, an external routes pointer, and an internal routes pointer. The external routes pointer references an external route structure 503. The external route structure 503 includes an external route A, an external route B, and an external route C. The internal routes pointer references an internal route structure 507. The internal route structure 507 includes an internal route A and an internal route B. A best route structure 505 includes an overall best route pointer, a best external route pointer, and a best internal route pointer.

In FIG. 5, the overall best route pointer references the external route A. The best external route pointer also references the external route A. The best internal route pointer references the internal route B. Bolded lines 523A and 523B respectively indicate communication of the external route B to the internal peers 511 A and 511B. The bolded lines 523C indicates communication of the internal route B to the external peer 513. As illustrated by FIG. 5, the best external route is communicated to the internal peers and not the external peers. Conversely, the best internal route is communicated to the external peers and not the internal peers.

Route oscillation is reduced by communicating best internal routes to the external peers and not to the internal peers. Route oscillation is also reduced by communicating a best external route to the internal peers and not to the external peers. Therefore, in order to reduce route oscillation within an autonomous system.

Figure 6:
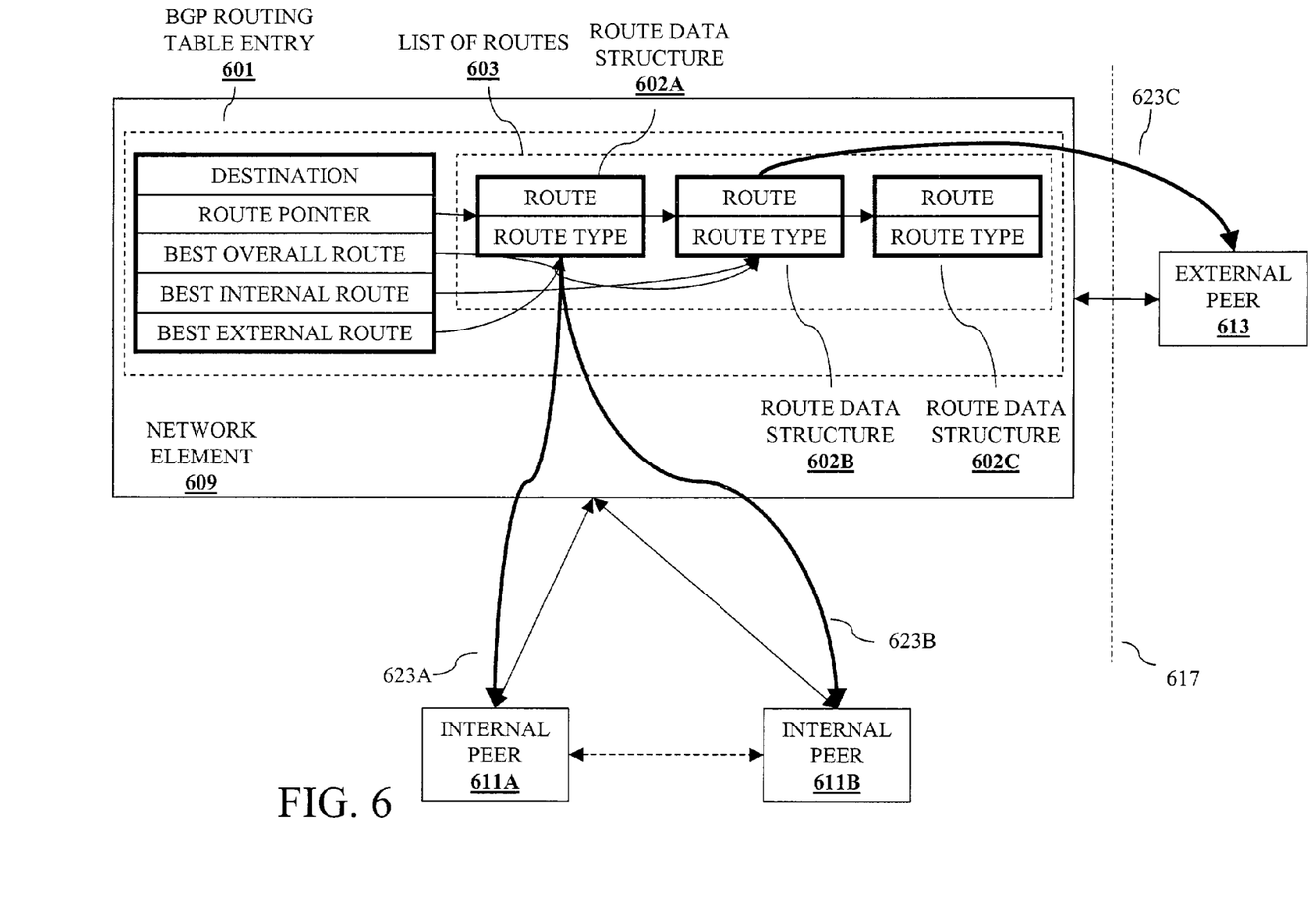
FIG. 6 is an exemplary diagram illustrating data structures for tracking and external routes and internal routes according to one embodiment of the invention.

FIG. 6 is an alternative exemplary diagram illustrating data structures for tracking a best external route and a best internal route according to one embodiment of the invention. In FIG. 6, a network element 609, and external peer 613, and an internal peers 611A and 611B are organized and communicate as illustrated in FIG. 5. The network element 609 includes a BGP routing table entry 601. The BGP routing table entry 601 indicates a destination, a route pointer, a best overall route pointer, a best internal route pointer, and a best external route pointer. The route pointer references a list of routes 603. The list of routes 603 includes route data structures 602A-602C. Each of the route data structures 602A-602C indicates a route and a route type. The route type is a value (e.g., bit, flag, etc.) that indicates whether the corresponding route is an internal route or an external route. The best overall route pointer references the route data structures 602B. The best internal route pointer also references the route structure 602B. It is for illustrative purposes that the best overall route pointer and the best internal route pointer reference the same route data structure. In another example, the best overall route pointer and the best external route pointer reference the same routing data structure. In yet another example, each of the best route pointers references a different route data structure. As in FIG. 5, the best internal route illustrated in FIG. 6 is communicated to the external peer 613, and the best external route is communicated to the internal peers 611A and 611B.

A variety of other data structures (e.g., arrays, linked lists, binary trees, etc.) and techniques can be used to track external routes, internal routes, the best external route, and the best internal route. In another embodiment of the invention, external routes and internal routes are tracked with separate data structures (e.g., separate arrays, separate linked lists, etc.), similar to FIG. 5. The separate data structures are ordered so that the best external route and the best internal route are at the beginning of their corresponding data structures. In such an embodiment of the invention, a best external route pointer and a best internal route pointer are not maintained because of the ordering. In another embodiment of the invention, the best internal route, the best external route, and the best overall route are each copied into a designated location in memory once determined.

Figure 7:
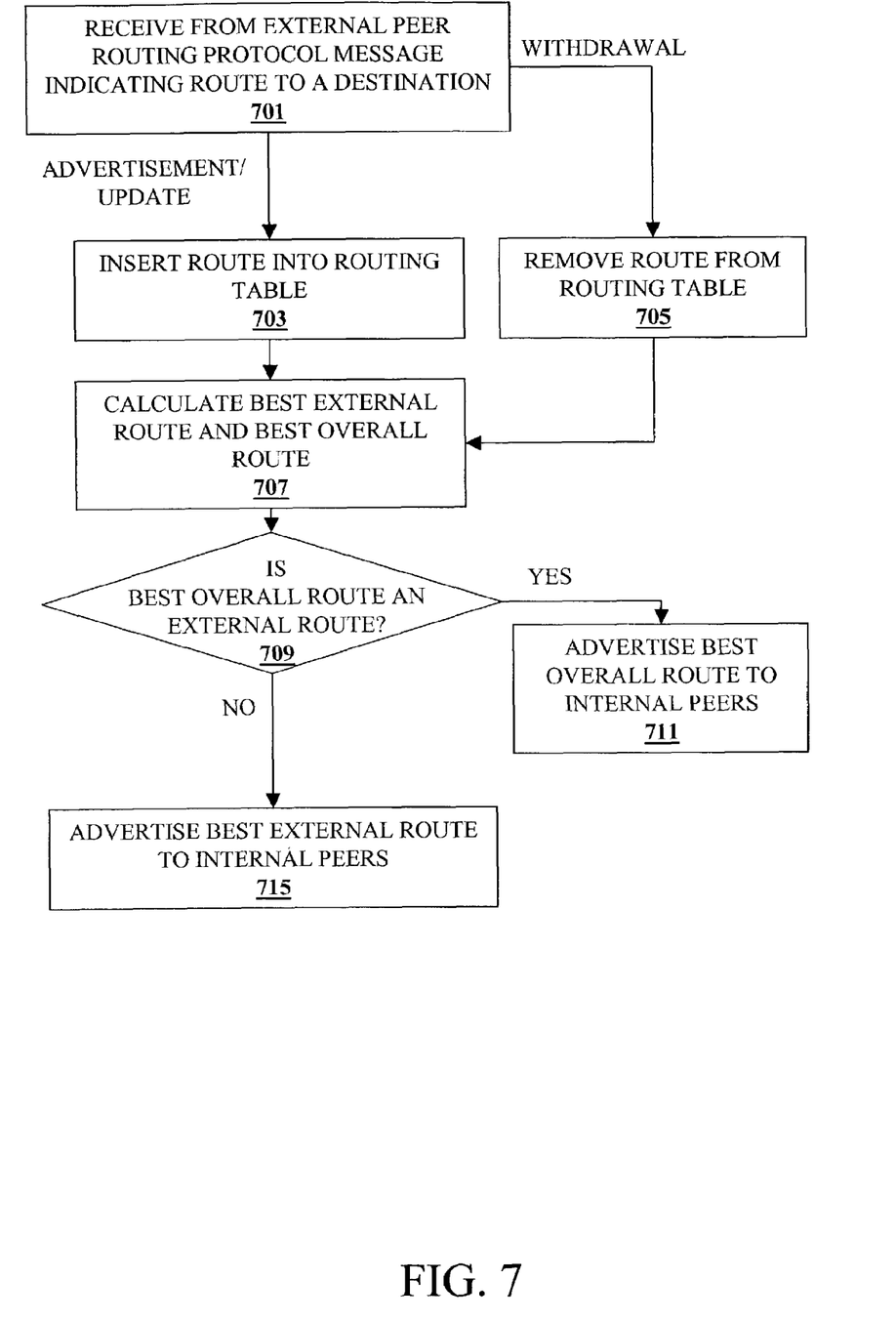
FIG. 7 is an exemplary flowchart for communicating a best external route according to one embodiment of the invention.

FIG. 7 is an exemplary flowchart for communicating a best external route according to one embodiment of the invention. At block 701, a routing protocol message that indicates a route to a destination is received from an external peer. If the routing protocol message is a withdrawal message, then control flows to block 705. If the routing protocol message is an advertisement/update message, then control flows to block 703.

A block 703, the route is inserted into the routing table. From block 703, control flows to block 707.

At block 705, the route is removed from the routing table. From block 705, control flows to black 707.

At block 707, the best external route and best overall route is calculated. At block 709, it is determined if the best overall route is an external route. If the best overall route is an external route, then control flows to block 711. If the best overall route is not an external route, then control flows to block 715.

At block 711, the best overall route is advertised to internal peers.

At block 715, the best external route is advertised to internal peers.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

Figure 8:
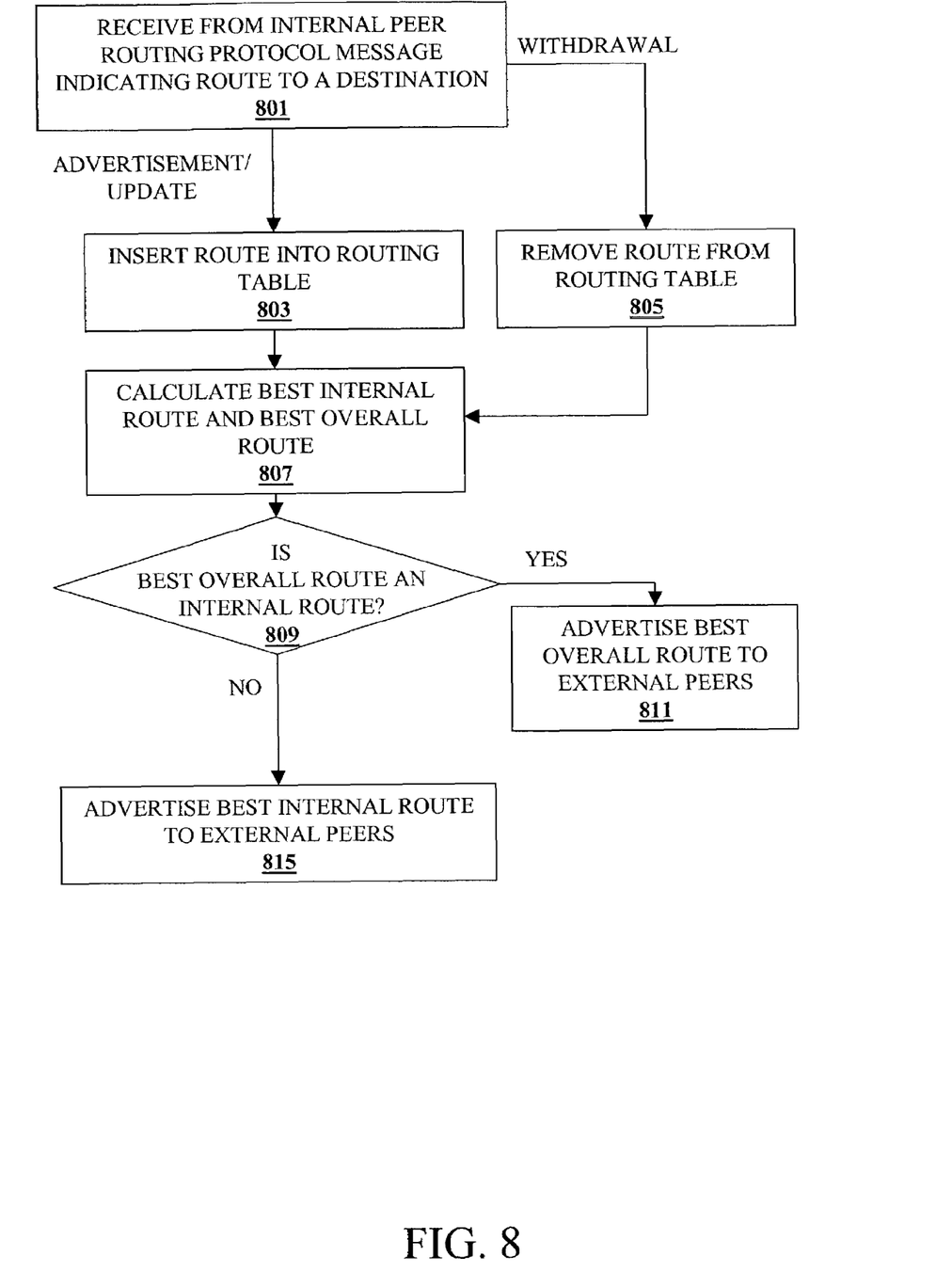
FIG. 8 is an exemplary flowchart for communicating a best internal route according to one embodiment of the invention.

FIG. 8 is an exemplary flowchart for communicating a best internal route according to one embodiment of the invention.

At block 801, a routing protocol message that indicates a route to a destination is received from an internal peer. If the routing protocol message is a withdrawal message, then control flows to block 805. If the routing protocol message is an advertisement/update message, then control flows to block 803.

A block 803, the route is inserted into the routing table. From block 803, control flows to block 807.

At block 805, the route is removed from the routing table. From block 805, control flows to black 807.

At block 807, the best internal route is calculated. At block 809, it is determined if the best overall route is an external route. If the best overall route is an 'external route, then control flows to block 511. If the best overall route is not an external route, then control flows to block 815.

At block 811, the best overall route is advertised to external peers.

At block 815, the best internal route is advertised to external peers.

As with FIG. 7, it should be understood that the order illustrated in FIG. 8 is exemplary (e.g., alternative embodiments may perform the operations in a different order, combine certain operations, overlap certain operations, etc.).

Figure 9:
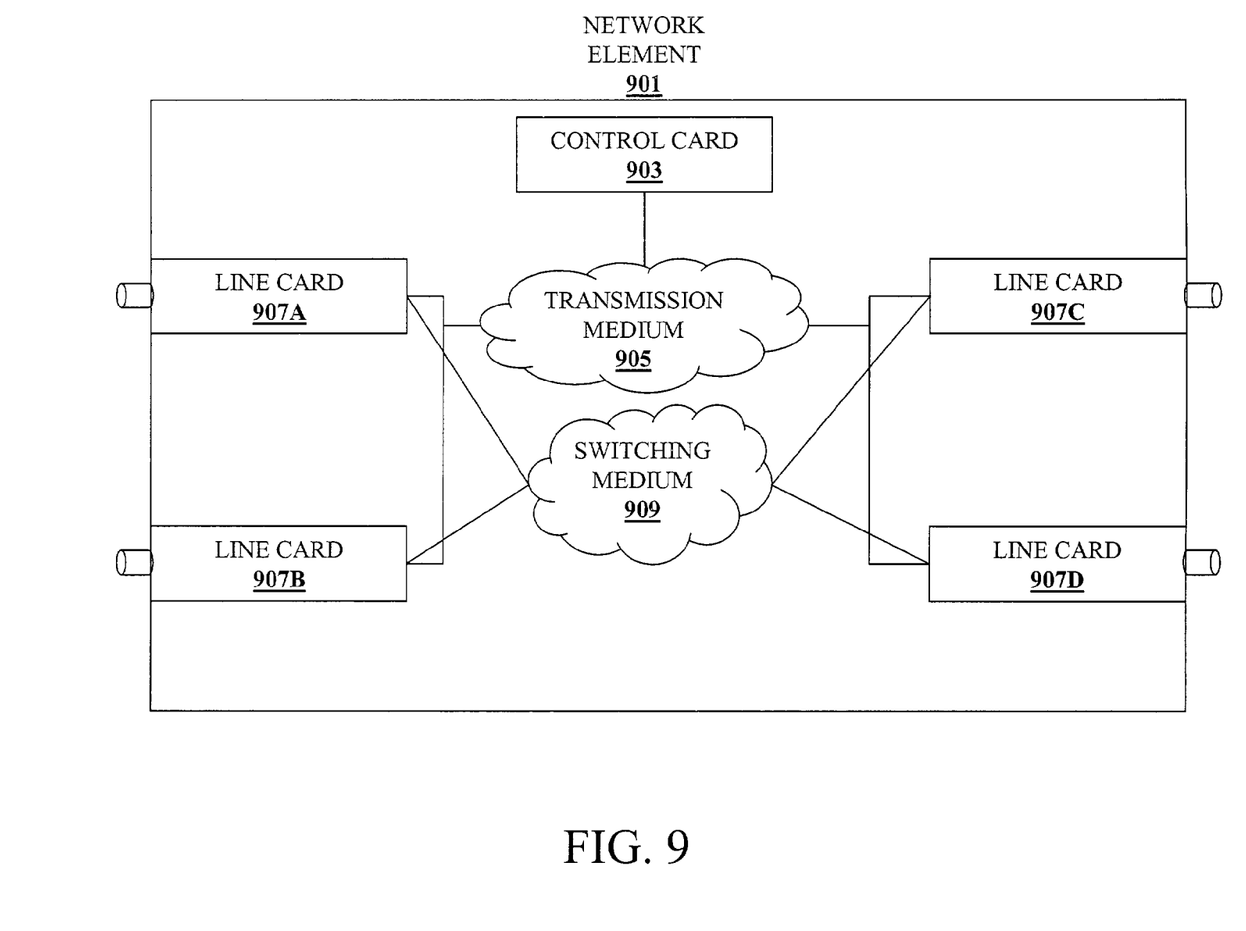
FIG. 9 is an exemplary diagram of a network element according to one embodiment of the invention.

FIG. 9 is an exemplary diagram of a network element according to one embodiment of the invention. In FIG. 9, a network element 901 includes a control card 903. The control card 903 is coupled with a transmission medium 905 (e.g., a system bus). The transmission medium 905 is coupled with the line cards 907A-907D. The transmission medium 905 carries information from the control card 903 to the line cards 907A-907D. The line cards 907A-907D are coupled with each other via the switching medium 909. The switching medium may be a separate switching unit including hardware and/or software to determine which line card to forward traffic to. Alternatively, the switching medium may be a mesh.

The network elements described in the Figures include memories, processors, and/or ASICs. Such memories include a machine-readable medium on which is stored a set of instructions (i.e., software) embodying any one, or all, of the methodologies described herein. Software can reside, completely or at least partially, within this memory and/or within the processor and/or ASICs. For the purpose of this specification, the term "machine-readable medium" shall be taken to include any mechanism that provides (i.e., stores and/or transmits) information in a form readable by a machine (e.g., a computer). For example, a machine-readable medium includes read only memory ("ROM"), random access memory ("RAM"), magnetic disk storage media, optical storage media, flash memory devices, etc.

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

I claim:

1. A network element comprising:
a control card to host a routing protocol process, the control card having a set of instructions to cause the control card to,
advertise a best external route to an internal peer of the network element, wherein the internal peer is within the network element's group,
advertise a best internal route to an external peer of the network elements, wherein the external peer is not within the network element's group, and
advertise a best overall route to the set of internal peers if the best overall route is an external route, and advertise the best overall route to the set of external peers and not advertise the best overall route to the set of internal peers if the best overall route is an internal route, the best overall route is calculated from a set of one or more internal routes and a set of one or more external routes; and
a set of one or more line cards coupled with the control card.

2. A network element of claim 1 wherein the routing protocol is the border gateway protocol.

3. A network element of claim 1 wherein the routing protocol is an interior routing protocol.

4. A network element of claim 1 wherein the network element is a route reflector and the network element's group is a cluster.

5. A network element of claim 1 wherein the network element's group is a confederation.

6. A network element of claim 1 further comprising a switching medium to carry traffic between the set of line cards.

7. A network element of claim 1 further comprising transmission medium to carry data between the set of line cards and the control card.

8. A network comprising:
a first network element of a first group;
a second network element of a second group; and
a third network element of the second group and having a first border gateway protocol (BGP) session with the first network element and a second BGP session with the second network element, the third network element advertising to the second network element a best external route received from a fourth network element not within the second group and advertising to the first network element a best internal route received from the second network element.

9. The network of claim 8 wherein the first and third network element are route reflectors and the first and second group are different clusters.

10. A network element of claim 8 wherein the first and second group are different confederations.

11. A network element of claim 8 further comprising the third network element calculating a best overall route from a set of internal routes and a set of external routes and advertising the best overall route to the second network element if the best overall route is an external route and to the first network element if the best overall route is an internal route.

12. A network element of claim 8 wherein calculating the best internal route comprises comparing a set of one or more internal routes with each other.

13. A network element of claim 8 wherein calculating the best external route comprises comparing a set of one or more external routes with each other.

14. A computer-readable medium having stored therein a set of computer executable instructions, which when executed by a set of one or more processors, cause said set of processors to perform operations comprising:
advertising to a set of one or more internal peers a best external route that has been received from an external peer, wherein said set of internal peers are within a network element's group;
advertising to a set of one or more external peers a best internal route that has been received from an internal peer, wherein said set of external peers are not within the network element's group; and advertising a best overall route to the set of internal peers if the best overall route is an external route, and advertising the best overall route to the set of external peers and not advertising the best overall route to the set of internal peers if the best overall route is an internal route, the best overall route is calculated from a set of one or more internal routes and a set of one or more external routes.

15. The computer-readable medium of claim 14 wherein the network element's group is confederation.

16. The computer-readable medium of claim 14 wherein the network element is a route reflector and the network element's group is a cluster.

17. The computer-readable medium of claim 14 wherein the best external route is determined by comparing a set of one or more external routes with each other.

18. The computer-readable medium of claim 17 wherein the set of external routes have been learned from the set of external peers.

19. The computer-readable medium of claim 14 wherein the best internal route is determined by comparing a set of one or more internal routes with each other.

20. A computer-readable medium having stored therein a set of computer executable instructions, which when executed by a set of one or more processors, cause said set of processors to perform operations comprising:
    tracking a set of one or more routes to a destination in a set of one or more data structures, wherein said set of routes includes an external route and an internal route, the external route having been received from an external peer that is not within the network element's group and the internal route having been received from an internal peer that is within the network element's group; and
    indicating a best overall route of the set of routes, a best internal route of the set or routes, and a best external route of the set of routes.

21. The computer-readable medium of claim 20 wherein tracking the set of one or more routes comprises managing a linked list of the set of routes, wherein each element of the linked list indicates one of the set of routes.

22. The computer-readable medium of claim 20 wherein indicating the best overall route, the best internal route, and the best external route comprises maintaining a best overall route pointer that references the best overall route, a best internal route pointer that references the best internal route, and a best external route pointer that references the best external route.

23. The computer-readable medium of claim 20 wherein tracking the set of routes in the set of data structures comprises tracking the set of routes in a linked list and an array.

24. The computer-readable medium of claim 20 wherein tracking the set of routes in the set of data structures comprises tracking the set of routes in a table and a tree.

25. The computer-readable medium of claim 20 wherein the network element's group is a confederation.

26. The computer-readable medium of claim 20 wherein the network element is a route reflector and the network element's group is a cluster.

27. A computer-readable medium having stored therein a set of computer executable instructions, which when executed by a set of one or more processors, cause said set of processors to perform operations comprising:
    advertising to a set of one or more internal peers a first route to a first destination responsive to determining the first route to be the best external route of a set of one or more external routes that include the first route, wherein said first route is communicated to a network element from an external peer that is not of the network element's group; and
    advertising a second route to a set of one or more external peers responsive to determining the second route to be the best internal route of a set of one or more internal routes that include the second route, wherein said second route is communicated to the network element from an internal peer that is within the network element's group.

28. The computer-readable medium of claim 27 wherein the network element's group is a confederation.

29. The computer-readable medium of claim 27 wherein the network element is a route reflector and the network element's group is a cluster.

30. The computer-readable medium of claim 27 further comprising advertising a best overall route to the set of internal peers if the best overall route is an external route and to the set of external peers if the best overall route is an internal route.

31. A computer-readable medium having stored therein a set of computer executable instructions, which when executed by a set of one or more processors, cause said set of processors to perform operations comprising:
    receiving a route to a destination from a first peer that is not within the network element's group;
    inserting the received route as an external route into a routing table having a set of one or more routes to said destination;
    calculating a best external route to said destination of a set of external routes that includes the received route;
    calculating a best overall route to said destination of the set of routes;
    if the best external route has changed, then advertising the best external route to a set of one or more internal peers; and
    if the best overall route has changed, then advertising the best overall route to the set of internal peers and to a set of one or more external peers.

32. The computer-readable medium of claim 31 wherein the network element's group is a confederation.

33. The computer-readable medium of claim 31 wherein the network element is a route reflector and the network element's group is a cluster.

34. The computer-readable medium of claim 31 wherein said routing table is a border gateway protocol routing table.

35. The computer-readable medium of claim 31 wherein said routing table is an interior gateway protocol routing table.

36. A computer-readable medium having stored therein a set of computer executable instructions, which when executed by a set of one or more processors, cause said set of processors to perform operations comprising:
    receiving a route to a destination from a first peer that is within a network element's group;
    inserting the received route as an internal route into a routing table having a set of one or more routes to said destination;
    calculating a best internal route of the set of routes;
    calculating a best overall route to said destination of the set of routes;
    if the best internal route has change, then adverting the best internal route to a set of one or more external peers; and
    if the best overall route has changed, then advertising the best overall to a set of one or more internal peers and to the set of external peers.

37. The computer-readable medium of claim 36 wherein the network element's group is confederation.

38. The computer-readable medium of claim 36 wherein the network element is a route reflector and the network element's group is a cluster.

39. The computer-readable medium of claim 36 wherein said routing table is a border gateway protocol routing table.

40. The computer-readable medium of claim 36 wherein said routing table is an interior gateway protocol routing table.

* * * * *